April 12, 1927.
L. F. HOWARD
1,624,248
RAILWAY TRAFFIC CONTROLLING APPARATUS
Filed June 21, 1926
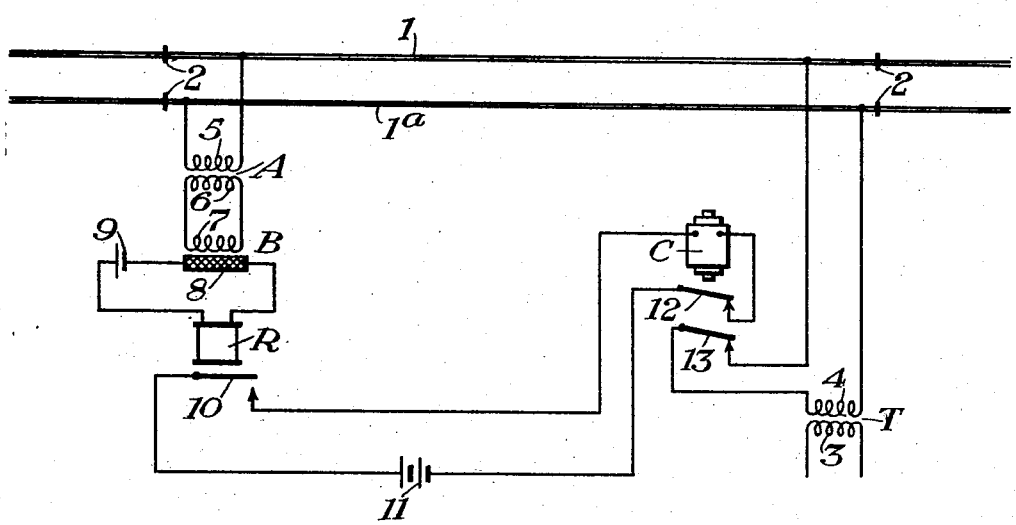
INVENTOR:
L. F. Howard,
by A. L. Vincill
His Attorney.

Patented Apr. 12, 1927.

1,624,248

UNITED STATES PATENT OFFICE.

LEMUEL F. HOWARD, OF EDGEWOOD BOROUGH, PENNSYLVANIA, ASSIGNOR TO THE UNION SWITCH & SIGNAL COMPANY, OF SWISSVALE, PENNSYLVANIA, A CORPORATION OF PENNSYLVANIA.

RAILWAY-TRAFFIC-CONTROLLING APPARATUS.

Application filed June 21, 1926. Serial No. 117,824.

My invention relates to railway traffic controlling apparatus, and particularly to apparatus of the type wherein the current supplied to a track circuit and used to energize a track relay, is periodically interrupted for the purpose of controlling train carried mechanism. One object of my invention is the provision of means for energizing the track relay after a train passes out of the track circuit in spite of such periodic interruption of the track circuit current.

I will describe one form of apparatus embodying my invention, and will then point out the novel features thereof in claims.

The accompanying drawing is a diagrammatic view showing one form of apparatus embodying my invention.

Referring to the drawing, the reference characters 1 and 1ª designate the track rails of a railway, which rails are divided by insulated joints 2 to form track sections, only one of which sections is shown in the drawing. This section is provided with a track relay R and a source of track circuit current T. As here shown, the source of track circuit current is a transformer, the primary 3 of which is constantly energized from a source of alternating current, not shown in the drawing, and the secondary 4 of which is connected across the track rails 1 and 1ª. Interposed between the secondary 4 and the rail 1 is a contact 13, which is periodically opened to interrupt the supply of current from the transformer T to the track rails. As here shown, this contact 13 is a back contact of a coding relay C which may be controlled in any suitable manner, such, for example, as by a circuit from a battery 11, through back contact 10 of track relay R, winding of relay C, and back contact 12 of relay C to battery 11. When back contact 10 is closed, relay C will be alternately energized and de-energized, so that contact 13 will be alternately opened and closed to periodically interrupt the supply of current from the transformer T to the track rails 1 and 1ª. Relay C will ordinarily be also controlled by traffic conditions in advance of the section illustrated in the drawing, but this control forms no part of my present invention, and is therefore omitted from the drawing to simplify the disclosure.

If the track relay R were energized directly from the track rails, as is usual in automatic signaling practice, this relay would be de-energized when the section is occupied by a train, and would remain de-energized after the train leaves the track section if the intervals during which the track circuit current is supplied to the rails are too short to effectively energize the relay. To overcome this difficulty, I interpose between the track rails and the track relay an energy integrating means for causing the relay to become energized by the periodically interrupted current which is supplied to the track rails when relay C is in operation. As here shown, the primary 5 of a transformer A is connected across the rails at the relay end of the section, and the secondary 6 of this transformer is connected with a heating element 7 of a thermo-sensitive relay B. This thermo-sensitive relay B also includes a thermo-sensitive substance 8 subjected to the heat from the heating element 7, and the substance 8 is included in a local circuit for relay R, which circuit is from a battery 9, through the substance 8 and the relay R to the battery 9. One purpose of transformer A is to prevent foreign direct current from reaching the heating element 7.

Under normal conditions, that is, when the track section is unoccupied, relay R is energized, because the heat supplied to substance 8 by the heating element 7 reduces the resistance of this substance to such value that sufficient current flows through relay R from battery 9 to energize the relay. Contact 10 is therefore open so that relay C is de-energized and the supply of track circuit current from transformer T to the track rails is uninterrupted. When a train enters the track section, it shunts the track circuit current from transformer A so that the thermo-sensitive substance 8 becomes cool and therefore increases the resistance of the local circuit for relay R to such a value that this relay becomes de-energized. The closing of back contact 10 starts the operation of relay C, so that the supply of current to the track rails from transformer T is periodically interrupted by the periodic opening of contact 13. When the train passes out of the track section, the heating element 7 is periodically supplied with current and therefore gradually increases the temperature of the thermo-sensitive substance 8 until this temperature reaches such a value that relay R becomes energized to open its back contact 10. This stops the operation of relay C, whereupon the supply of track circuit current again becomes uninterrupted and the apparatus is restored to its normal condition.

Although as here shown the relay C is controlled by a back contact of track relay R, this particular means for controlling relay C is not essential to my invention, but is desirable in order to prevent unnecessary operation of relay C while there is no train in the section with which this relay is associated.

Although I have herein shown and described only one form of apparatus embodying my invention, it is understood that various changes and modifications may be made therein within the scope of the appended claims without departing from the spirit and scope of my invention.

Having thus described my invention what I claim is:

1. Railway traffic controlling apparatus comprising a track circuit including track rails and a source of current, a track relay, means for periodically interrupting the supply of current from said source to the track rails, and energy integrating means interposed between the rails and said relay for causing the relay to become energized by the periodically interrupted current.

2. Railway traffic controlling apparatus comprising a track circuit including track rails and a source of current, a track relay, means for periodically interrupting the supply of current from said source to the track rails, and a thermo-sensitive integrating device interposed between the rails and said relay for causing the relay to become energized by the periodically interrupted current.

3. Railway traffic controlling apparatus comprising a track circuit including track rails and a source of current, a track relay, means for periodically interrupting the supply of current from said source to the track rails, a heating element receiving energy from the track rails, a thermo-sensitive element subjected to the heat from said heating element, and a circuit for said relay including said heating element and a source of current.

4. Railway traffic controlling apparatus comprising a track circuit including track rails and a source of current, a track relay, means for periodically interrupting the supply of current from said source to the track rails, a heating element receiving energy from the track rails, a thermo-sensitive element subjected to the heat from said heating element, and means for energizing said relay when the temperature of said thermo-sensitive element reaches a given value.

5. Railway traffic controlling apparatus comprising a track circuit including track rails and a source of current, a track relay, means for periodically interrupting the supply of current from said source to the track rails when said track relay is open but not when it is closed, and energy integrating means interposed between the rails and said relay for causing the relay to become energized by the periodically interrupted current.

6. Railway traffic controlling apparatus comprising a track circuit including track rails and a source of current, a track relay, means for periodically interrupting the supply of current from said source to the track rails when said track relay is open but not when it is closed, a heating element receiving energy from the track rails, a thermo-sensitive element subjected to the heat from said heating element, and a circuit for said relay including said heating element and a source of current.

7. Railway traffic controlling apparatus comprising a track circuit including track rails and a source of current, a track relay, means for periodically interrupting the supply of current from said source to the track rails when said track relay is open but not when it is closed, and a thermo-sensitive integrating device interposed between the rails and said relay for causing the relay to become energized by the periodically interrupted current.

8. Railway traffic controlling apparatus comprising a track circuit including track rails and a source of current, a track relay, means for periodically interrupting the supply of current from said source to the track rails, a transformer having its primary connected with said track rails, a heating element connected with the secondary of said transformer, a thermo-sensitive substance subjected to the heat from said heating element, and a circuit for said relay controlled by said substance and including a source of current.

9. Railway traffic controlling apparatus comprising a track circuit including track rails and a source of current, a track relay, means for periodically interrupting the supply of current from said source to the track rails, a circuit for said relay including a second source of current, and energy integrating means controlled by said track circuit and in turn controlling said relay circuit.

In testimony whereof I affix my signature.

LEMUEL F. HOWARD.